United States Patent
Knapp et al.

(10) Patent No.: US 6,862,676 B1
(45) Date of Patent: Mar. 1, 2005

(54) SUPERSCALAR PROCESSOR HAVING CONTENT ADDRESSABLE MEMORY STRUCTURES FOR DETERMINING DEPENDENCIES

(75) Inventors: Micah C. Knapp, Cambridge, MA (US); Poonacha P. Kongetira, Palo Alto, CA (US); Marc E. Lamere, Carlisle, MA (US); Julie M. Staraitis, Ayer, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 833 days.

(21) Appl. No.: 09/761,494

(22) Filed: Jan. 16, 2001

(51) Int. Cl.[7] .......................... G06F 9/34; G06F 12/06
(52) U.S. Cl. .......................... 712/217; 712/23; 712/27; 712/213; 712/248; 712/206; 711/108; 711/214
(58) Field of Search .......................... 712/23, 27, 206, 712/213, 217, 248, 219; 711/108, 214, 206

(56) References Cited

U.S. PATENT DOCUMENTS

| | | | |
|---|---|---|---|
| 5,553,256 A | * | 9/1996 | Fetterman et al. .......... 712/217 |
| 5,581,684 A | | 12/1996 | Dudzik et al. |
| 5,761,476 A | | 6/1998 | Martell |
| 5,790,857 A | | 8/1998 | Clifford et al. |
| 5,913,049 A | | 6/1999 | Shiell et al. |
| 5,918,005 A | * | 6/1999 | Moreno et al. .......... 714/38 |
| 5,923,328 A | | 7/1999 | Griesmer |
| 5,933,139 A | | 8/1999 | Feigner et al. |
| 5,961,634 A | | 10/1999 | Tran |
| 6,005,824 A | | 12/1999 | Crafts |
| 6,044,031 A | | 3/2000 | Iadanza et al. |
| 6,268,314 B1 | | 7/2001 | Hughes et al. |
| 6,360,314 B1 | | 3/2002 | Webb, Jr. et al. |
| 6,622,237 B1 | * | 9/2003 | Keller et al. .......... 712/216 |
| 6,629,233 B1 | | 9/2003 | Kahle |

FOREIGN PATENT DOCUMENTS

WO     93/20505     10/1993

* cited by examiner

*Primary Examiner*—Daniel H. Pan
(74) *Attorney, Agent, or Firm*—Meyertons Hood Kivlin Kowert & Goetzel, PC; B Noël Kivlin

(57) ABSTRACT

A superscalar processor having a content addressable memory structure that transmits a first and second output signal is presented. The superscalar processor performs out of order processing on an instruction set. From the first output signal, the dependencies between currently fetched instructions of the instruction set and previous in-flight instructions can be determined and used to generate a dependency matrix for all in-flight instructions. From the second output signal, the physical register addresses of the data required to execute an instruction, once the dependencies have been removed, may be determined.

32 Claims, 3 Drawing Sheets

SUPERSCALAR PROCESSOR HAVING CONTENT ADDRESSABLE MEMORY STRUCTURES FOR DETERMINING DEPENDENCIES

FIELD OF THE INVENTION

The present invention relates generally to processors for a computer system, and more particularly to a superscalar processor for performing out of order processing on instruction sets.

BACKGROUND OF THE INVENTION

A superscalar implementation of a processor architecture is one in which common instructions, e.g., integer and floating-point arithmetic, loads, stores and conditional branches, can be initiated out of order, and executed independently. However, such implementations raise a number of complex design issues related to instruction processing.

For purposes of clarity, certain terms used herein need to be defined. "Instruction-level parallelism" refers to the degree to which, on average, the instructions of a program can be executed in parallel or out of sequence. "In flight" means that an instruction is in the machine but not fully processed, e.g., the instruction is in a buffer waiting to be issued, or the instruction is being executed. "Dependency" refers to the way in which one instruction is effected by the processing or result of another instruction.

Superscalar processors are also known as Out-of Order processors. In a more traditional In-Order processor, e.g. a von Neumann type processor, the processor issues instructions in the exact order that would be achieved by sequential execution, and writes the results in the same order. In other words the processor will fetch an instruction in sequential order, decode it, issue it, execute it and write it back in sequential order. In contrast, Out of Order processors will use a combination of hardware and software techniques to execute multiple instructions in parallel by taking advantage of inherent instruction-level parallelism in a program. A typical superscalar processor will fetch a predetermined number of instructions (a bundle) into the machine simultaneously, and may have a large number of instructions "in-flight" simultaneously. Instructions may be fetched, executed, made to change registers and written back simultaneously or with little regard for their sequential order to increase processing speed. A constraint on the processor is that the result must be correct.

However, the degree of instruction level parallelism in a program is limited in large part on the number and types of data dependencies which may exist between instructions. Two types of data dependencies frequently encountered are known as: 1) a true data dependency or a Read-Write data hazard, and 2) an output dependency or a Write-Read data hazard. In a Read-Write data hazard (true data dependency) the current instruction needs data produced by a previous instruction. By way of example, consider the following sequence of instructions:

(I1) add r1, r2; load register r1 with the contents of r2 plus the contents of r1.

(I2) move r3, r1; load register r3 with the contents of r1. The second instruction (I2) can be fetched and decoded, but cannot execute until the first instruction (I1) executes. The reason is that one of the inputs (source register (r1)) of the second instruction (I2) is also the output (destination register (r1)) of the first instruction (I1). That is, the second instruction (I2) needs the data produced by the first instruction (I1), and must wait for I1 to write the data to r1 before I2 can read the data from r1.

With no such dependency, two instructions can be fetched and executed in parallel. If there is a Read-Write data hazard between the first and second instructions, then the second instruction is delayed as many clock cycles as required to remove the dependency. In general, any current dependent instruction must be delayed until all of its input values (source registers) have been produced as output values (destination registers) by the previous instructions from which they depend. Therefore, superscalar processors must be able to flag these dependencies until they can be removed.

A Write-Read data hazard (output dependency), arises when the same register is used as the destination register in two separate instructions. In that case the second instruction can overwrite the data of the first instruction. This is basically a storage conflict, where the compiler is running out of architectural registers that are available to use. (The term "architectural register" is a software concept referring to a finite set of instruction symbols, e.g., R1 through R10, which represent registers in a program language, such as assembler, that are accessible to a programmer. In other words, those software registers within an instruction set that have a direct impact on the logical execution of a program.) Consider the following instruction set:

(I1) R3=R3−R5
(I2) R4=R3+1
(I3) R3=R5+1
(I4) R7=R3−R4

In this case, I2 is dependent on I1, and I4 is dependent on I3. These are examples of true data dependencies (Read-Write data hazards). However, the relationship between 11 and 13 is different. There is no true data dependency as defined earlier, but if I3 executes to completion prior to I1, then the wrong value of the contents of R3 will be fetched for execution of I4. Consequently, I3 must complete after I1 to produce the correct output values.

Write-Read data hazards (output dependencies) have grown over the years because many programs for early model processors, e.g., Intel's 286, were required to run on later model processors, e.g., Intel's 586. As the newer model machines became more powerful, the number of physical registers (actual hardware registers) grew substantially, but the number of architectural registers (software registers) did not.

However, because in most processors the number of physical registers far exceeds the number of architectural registers, the Write-Read data hazards can be solved through a process called "register renaming". Register renaming is when physical registers are allocated dynamically by the processor hardware, and they are associated with the values of the architectural registers needed by instructions at various points in time. Consider the above sequence of instructions after register renaming:

(I1) R3(b)=R3(a)−R5(a)
(I2) R4(a)=R3(b)+1
(I3) R3(c)=R5(a)+1
(I4) R7(a)=R3(c)−R4(a)

The register references without the letter in parenthesis refer to the architectural registers found in the instruction. The register references with the letter in parenthesis refer to the physical registers allocated to hold a new value. In this example, the creation of register R3(c) in instruction I3 avoids the Write-Read data hazard on the first instruction I1, because R3(a) and R3(c) are two separate physical registers.

Register renaming is often accomplished through the use of a functional unit called an Instruction Renaming Unit (IRU).

However, the renaming process creates additional problems in a superscalar processor. The superscalar processor not only must be able to flag dependencies between instructions, but must also be able to map all the physical registers to the architectural registers for each dependent instruction fetched. Additionally, the superscalar processor must be able to determine the dependencies between the instructions within a current fetch bundle (intra dependencies), as well as be able to determine the dependencies between the instructions in the fetched bundle and the in-flight instructions (inter dependencies). Moreover, the process of determination must be done quickly, within one cycle.

Accordingly, there is a need for an improved superscalar processor capable of quickly determining both the dependencies of an instruction, and the necessary addresses of the physical registers required by the instruction for execution.

SUMMARY OF THE INVENTION

The present invention offers advantages and alternative over the prior art by providing a superscalar processor having a content addressable memory (CAM) structure that transmits a first and second output signal. The superscalar processor performs out of order processing on an instruction set. From the first output signal, the dependencies between currently fetched instructions of the instruction set and previous in-flight instructions can be determined and used to generate a dependency matrix for all in-flight instructions. From the second output signal, the physical register addresses of the data required to execute an instruction, once the dependencies have been removed, may be determined.

The present invention enables the superscalar processor to determine the dependencies and the necessary physical addresses in a regular and controllable design, thus reducing hardware and software requirements. Additionally, the design is very fast because the determination of dependencies and addresses can often be performed in one clock cycle.

These and other advantages are accomplished in an exemplary embodiment of the invention by providing a superscalar processor for performing out of order processing on an instruction set having a plurality of instructions and a plurality of architectural registers associated therewith. The superscalar processor comprises at least one execution unit for executing a plurality of in-flight instructions of the instruction set. The superscalar processor also includes a plurality of physical registers and a fetch unit for fetching the instructions from the instruction set. An instruction renaming unit (IRU) of the processor is used for renaming architectural registers to physical registers to overcome write-read data hazards encountered during the processing of the instruction set. An instruction scheduling unit (ISU) of the processor is used for scheduling the in-flight instructions for execution. The ISU includes a dependency matrix for storing dependency data of the in-flight instructions and an instruction wait buffer (IWB) for storing physical register address data necessary to execute the in-flight instructions when the dependency matrix indicates that the dependencies of the in-flight instructions have been removed. The CAM structure of the processor has a comparator section mapped to an array section. The CAM structure transmits a first output signal for generating the dependency data stored in the dependency matrix and a second output signal for generating the physical register address data stored in the IWB.

In an alternative embodiment of the invention, the CAM structure further comprises a plurality of CAM structures each having a first and second output signal. The first output signals are logically OR-ed together by an ORing device to generate the dependency data.

In another alternative embodiment of the superscalar processor the instructions have a first predetermined maximum number of register source fields (RS fields) having architectural addresses for input data. Additionally the instructions have at least a maximum number of one register destination fields (RD fields) having an architectural address for output data. The comparator section of the CAM structure includes a register dependency checker (RDC) for comparing an RS field of a fetched instruction which is not in-flight to an RD field of an in-flight instruction. The first output signal of the CAM includes a hit detect signal indicative of the architectural address of the RD field. The hit detect signal is generated when a match, i.e., hit, between the RS field and the RD field is detected by the RDC. Additionally the hit detect signal is transmitted to the array section of the CAM structure. The array section includes an in-flight physical register mapper (IPM), and the second output signal includes an output signal of the IPM indicative of the physical register address of the RD field which is generated when the IPM receives the hit detect signal.

BRIEF DESCRIPTION OF THE DRAWINGS

FIG. 4 is a detailed schematic block diagram of an entry structure of FIG. 3.

DETAILED DESCRIPTION OF THE PREFERRED EMBODIMENT

For purposes of clarity, a glossary of terms used herein is as follows:

| | |
|---|---|
| CAM: | content addressable memory |
| CC: | condition code |
| IPM: | in-flight physical register mapper |
| IRU: | instruction renaming unit |
| ISU: | instruction scheduling unit |
| IWB: | instruction wait buffer |
| RD: | register destination |
| RDC: | register inter-dependency checker |
| RS: | register source |
| SP: | superscalar processor |

Figure 1:
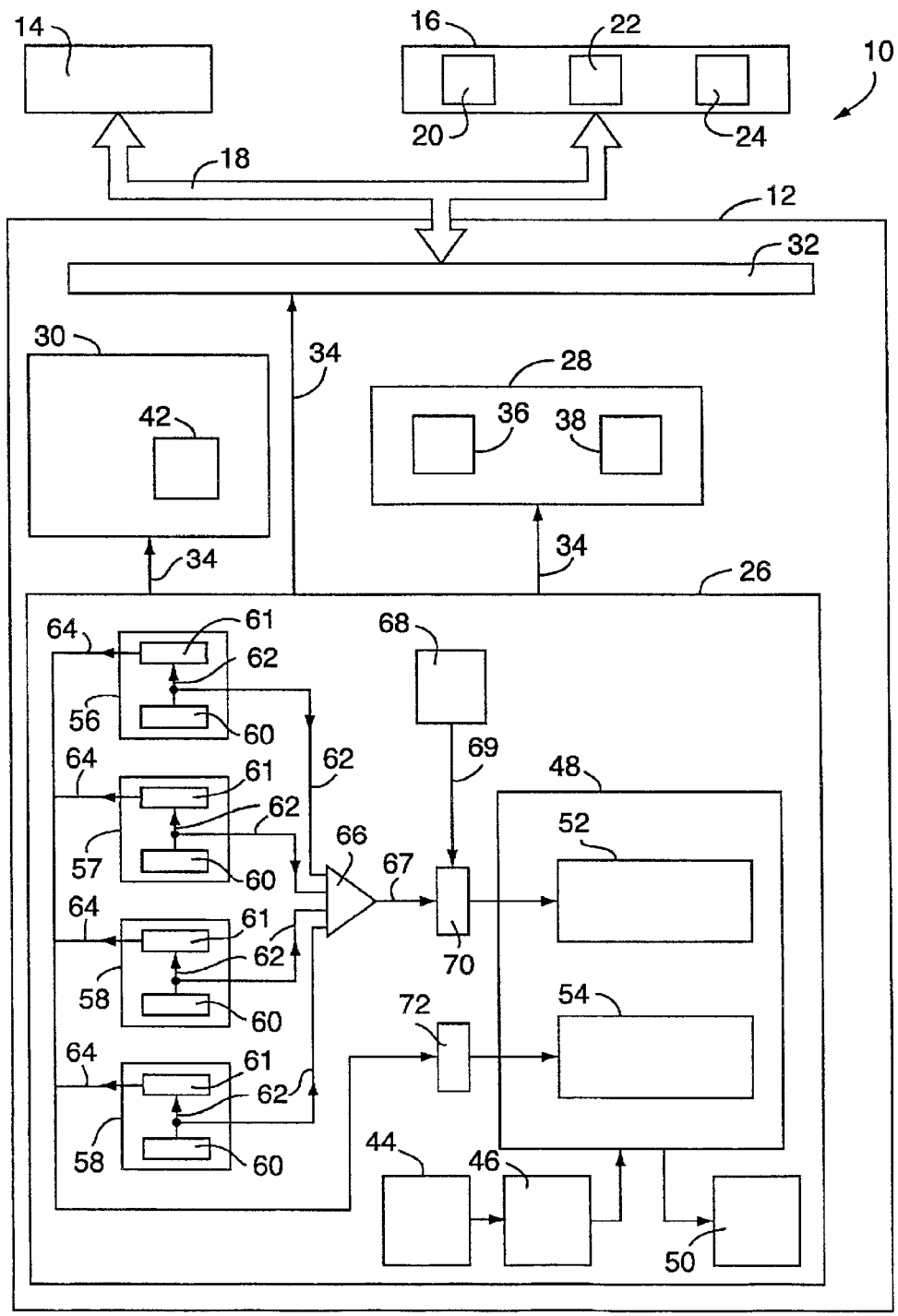
FIG. 1 is a schematic block diagram of a computer system in accordance with the present invention.

Referring to FIG. 1, an exemplary embodiment of a computer system 10 in accordance with the present invention is shown having a superscalar processor (SP) 12, an input/output subsystem 14 and a memory subsystem 16, all of which are in communication with one another through bus 18. The input/output subsystem 14 may be connected to a variety of input/output devices (not shown), e.g., keyboards, disk storage devices, network interfaces, display units, and pointing devices such as a mouse. The memory subsystem will have one or more types of memory such as various forms of random access memory 20, read only memory 22, and programmable read-only memory 24.

The SP 12 includes a control unit 26, a variety of execution units 28, and physical (actual hardware) data registers 30 that perform the instructions in a computer program stored in the memory subsystem 16. A bus interface unit 32 controls instruction and data transfers to and from the SP 12, and a plurality of internal buses 34 provide communication between the control unit 26 and the registers 30, the execution units 28 and the bus interface unit 32. The SP 12 acts as a central processing unit because it fetches instructions from the memory subsystem 16, stores results back into the memory subsystem 16, and exchanges output with the input/output subsystem 14.

There may be many execution units 28, commonly including an arithmetic logic unit 36, a floating-point unit 38, and special-purpose units (not shown) to execute instructions for displaying graphics or instructions for performing computations on arrays of data. The arithmetic logic unit 36 executes most instructions on integer data types, such as add, subtract, shift, rotate, and bitwise logical operations. The floating-point unit 38 often includes distinct addition, multiplication, and division units, and has a separate register set for operands and results.

The physical registers 30 are data arrays that provide high-speed storage and access of instructions and data for the SP 12. The registers 30 include a queue area 42 for storing up to 128 in-flight instructions, which are in various stages of being processed by the SP 12. Although this embodiment describes the queue area 42 as storing up to 128 in-flight instructions, one skilled in the art would know that the queue area could be designed to hold any predetermined number of in-flight instructions.

An instruction set architectural specification specifies the number of architectural registers that exist in the SP12. The architectural registers target storage locations (physical registers) that the programmer uses when programming the SP12. The actual number of physically implemented registers 30 in the SP12 is determined by the design team and usually exceed the number of architectural registers. Therefore, there is at least (and usually more than) a one to one correspondence between architectural and physical registers 30. The SP12 assigns a physical register 30 to an architectural register "on the fly". In this way, the SP12 can dynamically allocate the SP12's resources to maintain optimum utilization of resources. A simple example of this is if a designer wrote a program that only uses 2 architectural registers, the SP12 would not be restricted to only using 2 of its physical registers 30. It could use all of its physical registers 30 to represent the two architectural registers in different stages of the program's execution.

The control unit 26 decodes instructions and sequences the actions of the different execution units 28. The control unit 26 also resolves conflicts between resources, and responds to internal and external interrupts. The control unit 26 may be implemented by fixed logic circuitry (hard-wired), microprogrammed or both. The control unit 26 includes the functional units required to carry out pipeline processing of an instruction.

The term "pipelining" refers to the approach in which an operation is separated into several stages, each accomplishing a fraction of the work required by the operation. The stages are connected in a linear sequence or pipe. An operation enters through an end of the sequence and proceeds from one stage to the next until the result exits at the other end of the pipe. Parallelism is achieved by operating the pipe as an assembly line, i.e., in such a way that several operations, each at a different stage, could be underway simultaneously. Typically, pipeline processing of an instruction set includes utilization of at least the following functional units within the control unit 26: a fetch unit 44, an instruction renaming unit (IRU) 46, an instruction scheduling unit (ISU) 48, and a write back unit 50.

Fetch units in general fetch instructions and data from the memory or other registers. The fetch unit 44 of the superscalar processor SP 12 fetches eight instructions simultaneously in what is called a bundle 45 (see in FIG. 2). As will be described in greater detail hereinafter, the SP 12 determines the intra-dependencies between the eight instructions I(0)–I(7) in the bundle 45, and the inter dependencies between the bundle 45 and the in-flight instructions, in order to perform out of order processing. Though this embodiment generates a bundle of 8 instructions, one skilled in the art will recognize that an out of order processor, i.e., superscalar processor, may be designed to fetch any predetermined number of instructions in a bundle.

The IRU 46 renames the architectural registers associated with the instructions in the bundle 45 to physical registers as needed, i.e., when values are in conflict for the use of physical registers, before submitting them to the ISU 48. In order to maximize the inherent parallelism of the instruction set, the ISU 48 monitors all dependencies between the current fetch bundle 45 and the previous in flight instructions. Once the dependencies have been removed, the ISU 48 issues the instructions for execution to one or more of the execution units 28, e.g., the arithmetic logic unit 36, the floating-point unit 38 or the other special purpose units. Upon completing execution the write back unit 50 writes the newly calculated output data into the correct destination register.

However, in order for the ISU 48 to keep track of the dependencies between the current instructions in the fetch bundle 45 and the previous in-flight instructions, it is provided the following two important pieces of information for each instruction in the bundle:

1) a list of the in-flight instructions that an instruction in the current bundle is dependent upon, i.e., the dependency data, which are stored in a dependency matrix 52 of the ISU 48; and 2) the addresses of the physical registers that contain the data necessary to execute the in-flight instructions when the dependencies are removed, i.e. the physical register address data, which are stored in an instruction wait buffer (IWB) 54 of the ISU 48.

The Instruction Wait Buffer 54 queues the data locations and operation codes of the instructions while they are waiting to be executed. As data becomes available in the SP12, usually from completing instructions, the dependence matrix 52 will determine that a dependency no longer exists and will "pick" the next set of instructions to execute. Since all the information needed to execute the instruction is stored in the IWB 54, the SP12 only needs to read the IWB 59 entry to determine what the instruction is and how to execute it.

Advantageously, the dependency data and the physical register address data is quickly determined and passed to the ISU 48 through the use of four content addressable memory (CAM) structures 56, 57, 58 and 59. Each CAM structure 56–59 includes a comparator section 60 utilized as a register dependency checker (RDC). The comparator section 60 is mapped to an array section 61 utilized as an in-flight Physical Register Mapper IPM).

Figure 2:
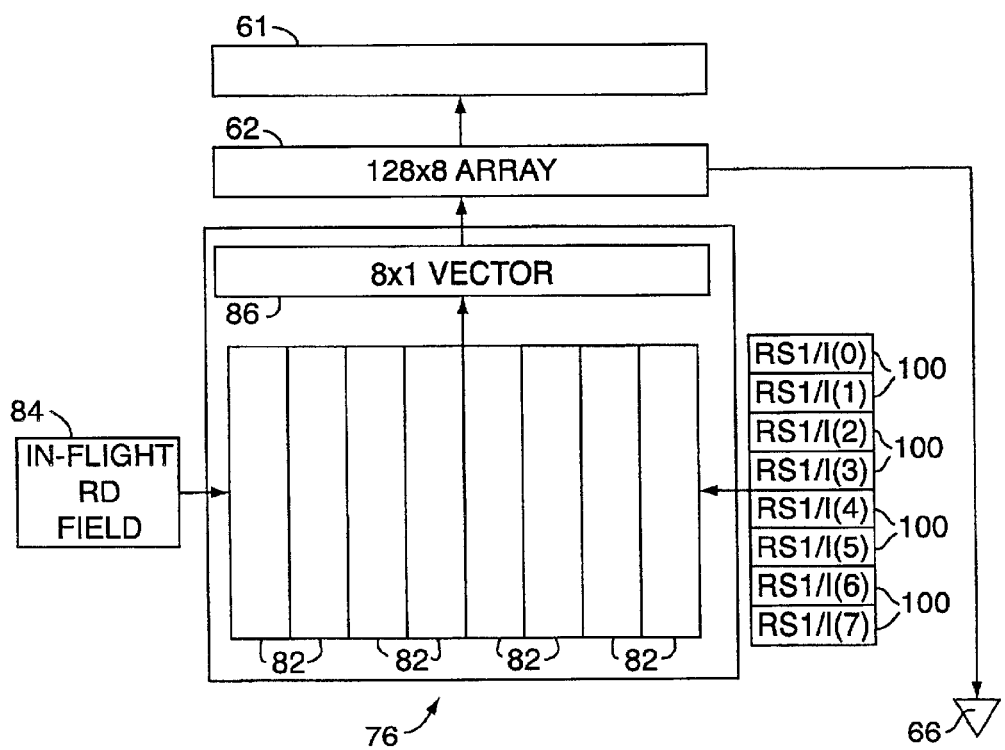
FIG. 2 is a simplified schematic block diagram of a fetched bundle of instructions in accordance with the present invention.

Referring to FIG. 2, a bundle 45 includes eight instructions I(0)–I(7) which are fetched simultaneously from the memory subsystem 16 by the fetch unit 44. Each instruction of the current fetch bundle 45 includes four fields of data: RS1 field, RS2 field, RD/RS3 field and CC field, as indicated by reference numbers 100, 102, 104 and 106 respectively. The RS1 field 100 and RS2 field 102 are eight bit register source fields (RS fields) having the architectural register addresses (instruction sources) which contain the input data for each instruction I(0)–I(7). The RD/RS3 104 may be used as an eight bit register destination field (RD field) having the architectural register address (instruction destination) of where the output will be written to, once the instruction I(0)–I(7) is executed. The RD/RS3 field 104 may alternatively be used as an eight bit source register field (RS3 field) in lieu of an RD field. The CC field 106 is a special purpose source register field containing a four bit condition code associated with each instruction I(0)–I(7) used to describe the result of the execution, e.g., negative, positive, zero or overflow. Based on this configuration, it is possible to have up to four source register fields, i.e., the RS1 field, RS2 field, RS3 field and CC field, in any current instruction I(0)–I(7). Though this embodiment describes four fields having either eight or four bits, one skilled in the art would recognize that any number of predetermined fields having any number of predetermined bits may be used.

Referring again to FIG. 1, the RDCs 60 of CAM structures 56–59 compare all of the incoming instruction sources (RS fields) of the bundle 45 to all of the in-flight instruction destinations (RD fields) to determine all the true dependencies therebetween (Read-Write data hazards). Since each instruction I(0)–I(7) of bundle 45 has a maximum four possible source register fields that can have a dependency on an in-flight instruction destination register field, four sets of CAM structures 56–59 are provided. Each CAM structure 56–59 is dedicated to a single instruction field, i.e., CAM structure 56 compares the RS1 fields 100 of bundle 45 to all in-flight RDs, CAM structure 57 compares the RS2 fields 102 of bundle 45 to all in-flight RDs, CAM structure 58 compares the RD/RS3 fields 104 and CAM structure 59 compares the CC fields 106.

When an RDC 60 (comparator section) of a CAM structure 56–59 detects a match (a hit), a true dependency has been detected and a "hit detect signal" 62 is transmitted to the IPM 61. The hit detect signal 62 is simultaneously transmitted as an additional output signal of a CAM structure 56–59 to be logically OR-ed together at an ORing unit 66 with the other hit detect signals 62 from the other CAM structures. ORing unit 66 may include such devices as an OR gate, an array of logic gates or CMOS domino logic gates. When the IPM (array section) 61 of CAM structures 56–59 receive the hit detect signal 62, they generate output signals 64 of the physical register address mapped to the architectural register address contained in the particular source register field, RS1, RS2, RS3/RD or CC, which produced the hit.

Since the dependency matrix 52 of the ISU 48 does not need to know which field of the incoming instruction caused the dependency, the four hit detect signals 62 of an instruction are logically OR-ed together by ORing unit 66 to send one dependency signal 67 per in-flight instruction. Additionally, an intra-dependency checker 68 transmits an intra-dependency output signal, which combines with the dependency signal 67 to provide a dependency array 70, which is sent to the dependency matrix 52 of the ISU 48.

At the same time, the IWB 54 of the ISU 48 does need to know the addresses of the physical registers for all RS fields of the incoming instructions, if a dependency exists. Therefore, the output signals 64 of the IPMs 61 are combined together to form a control word 72 containing the relevant physical register addresses. The control word 72 is then transmitted to the IWB 54 of the ISU 48.

Figure 3:
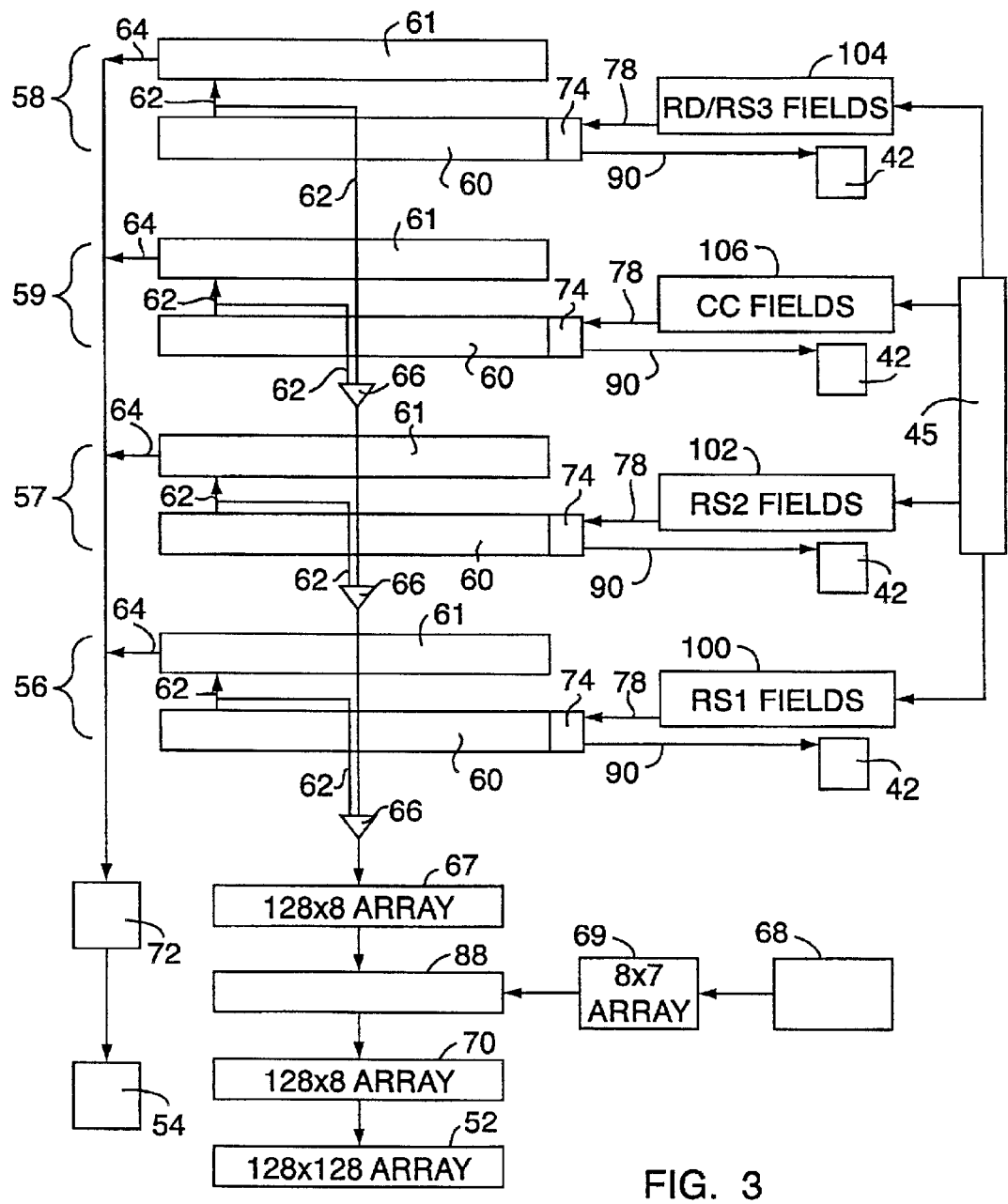
FIG. 3 is detailed schematic block diagram of the CAM structures of FIG. 1.

Referring to FIG. 3, a detailed schematic of the CAM structures 56–59 is presented. Each CAM structure 56–59 compares the specific field, RS1 field 100, RS2 field 102, RD/RS3 field 104 and CC field 106, to which it is dedicated, for all eight instructions I(0)–I(7) of the bundle 45, to the up to 128 in-flight RD fields.

By way of example, assume that the fetch unit 44 has fetched a current bundle 45 of eight instructions I(0)–I(7) as shown in FIG. 2, and that the number of previous in-flight instructions in the queue area 42 is 120 out of a theoretical maximum of 128. Since each CAM structure 56–59 functions in essentially the same manner, the example is simplified by focusing on CAM structure 56. RDC 60 of CAM structure 56 includes a data driver portion 74 and a set of 128 entry structures 76 (best seen in FIG. 4), one entry structure 76 associated with each RD field of the theoretical maximum number of in-flight instructions. The data driver portion receives from signal line 78 an 8×8 array of data representing the eight bit long RS1 fields 100 for each of the eight instructions I(0)–I(7) in bundle 45. The data driver portion 74 conditions and transmits the RS1 fields 100 to each of the 128 entry structures 76.

Referring to FIG. 4, a detailed schematic of an entry structure 76 if FIG. 3 is presented. Each entry structure 76 includes a bank of eight comparators 82, one comparator for each RS1 field 100 of instructions I(0)–I(7). The comparators 82 substantially simultaneously compare each RS1 field 100 of the instructions I(0)–I(7) to an RD field 84 of the previous in-flight instruction that the entry structure 76 is associated with.

Each of the 128 entry structures 76 then generates an 8×1 hit detect vector 86. Each logical voltage high (logical 1) bit of the hit detect vector 86 represents a hit (or compare) detected between an in-flight RD field 84 and an RS1 field 100 of one of the instructions I(0)–I(7). The hit detect signal 62 is a 128×8 array which includes the combined total output of all 128 of the eight bit hit detect vectors 86. The hit detect signal 62 is transmitted simultaneously to the IPM 61, and as an output signal of the CAM structure 56 to be logically OR-ed at OR-ing unit 66.

Referring again to FIG. 3, the IPMs 61 of CAM structures 56–59 are array sections, which map the physical register addresses to the architectural register addresses for the previous in-flight instructions on which the current fetch bundle 45 depends. For every logical high of the hit detect signal 62 received by IPM 61 of CAM structure 56, a physical register address is transmitted in the form of output signal 64 which corresponds to the architectural register address of the in-flight RD field matching the RS1 field 100 of the instruction I(0)–I(7) which had the hit. The output signal 64 of CAM structure 56 is combined with the output signals 64 of CAM structures 57–59 corresponding to the physical register addresses of the RS2, RD/RS3 and CC fields which also had hits for the same instruction. These physical register addresses from signals 64 are then combined into the control word 72 which, together with other input signals from additional sources (not shown), contains all of the physical register addresses necessary to execute the instruction once all of its dependencies have been removed. The control word 72 is in turn transmitted to the IWB 54 of the ISU 48 for processing.

Though the IWB 54 must know the locations of the specific fields RS1, RS2, RD/RS3, and CC that had a hit within each instruction I(0)–I(7), the dependency matrix 52 does not. The dependency matrix 52 only needs to know that the particular instruction I(0)–I(7) had a hit as represented by a single logical high for the instruction. Therefore, the hit detect signal 62, which is simultaneously transmitted as an output signal of CAM structure 56, is logically OR-ed together at ORing units 66 with each of the hit detect signals 62 of CAM structures 57–59 to form the dependency signal 67. The dependency signal 67 is in the form of an inter dependency mask 67 having a 128×8 array, which represents the hits (logical 1s), or no-hits (logical 0s), for the 128 potential in-flight instructions compared to each of the eight instructions I(0)–I(7) of the current fetch bundle 45. The interdependency mask 67 is merged with output signal 69, which is in the form of an intra dependency mask having an 8×7 array, from the intra dependency checker 68 at a merge dependency checker 88. The output signal of the merge dependency checker 88 is the dependency array 70 which reflects all intra dependencies within the instructions I(0)–I(7) of the bundle 45, and inter dependencies between the bundle 45 and the in-flight instructions. The dependency array 70 is in turn transmitted to the dependency matrix 52, which is a 128×128 array representing the total potential dependencies of the theoretical maximum number of 128 in-flight instruction.

Once the CAM structures 56–59 have finished processing the instructions I(0)–I(7) of the bundle 45, those instructions are now considered to be in-flight, and another bundle is fetched. Therefore the now in-flight instructions I(0)–I(7) are input into the queue area 42 via signal lines 90. In this example, if there are 120 previous in-flight instructions in the queue area 42 which have not yet finished executing, and if all of the instructions of the bundle 45 have a dependency, then theoretically there will be enough registers left in the queue area 42 to handle the now new in-flight instructions. However, in reality, the queue area 42 rarely fills.

The present invention enables the superscalar processor 12 to determine the dependencies and the necessary physical addresses in a regular and controllable design, thus reducing hardware and software requirements. Additionally, the design is very fast because the determination of dependencies and addresses can often be performed in one clock cycle.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A superscalar processor for performing out of order processing on an instruction set having a plurality of instructions and a plurality of architectural registers associated therewith, the superscalar processor comprising:

at least one execution unit for executing a plurality of in-flight instructions of the instruction set;

a plurality of registers;

a fetch unit for fetching the instructions from the instruction set;

an instruction renaming unit (IRU) for renaming architectural registers to physical registers during the processing of the instruction set wherein the instruction set comprises one or more instructions whose data sources and destinations are registers;

an instruction scheduling unit (ISU) for scheduling the in-flight instructions for execution, the ISU including a dependency matrix for storing dependency data of all the in-flight instructions and an instruction wait buffer (IWB) for storing physical address data and operation codes necessary to execute the in-flight instructions when the dependency matrix indicates that the dependencies of the in-flight instructions have been removed; and a content addressable memory (CAM) structure having a comparator section mapped to an array section, the CAM structure transmitting a first output signal for generating the dependency data stored in the dependency matrix and a second output signal for generating the physical register address data stored in the IWB.

2. The superscalar processor of claim 1 wherein the CAM structure further comprises a plurality of CAM structures each having a first and second output signal, the first output signals being logically OR-ed together at an ORing unit to generate the dependency data.

3. A superscalar processor for performing out of order processing on an instruction set having a plurality of instructions and a plurality of architectural registers associated therewith, which have a first predetermined maximum number of register source fields (RS fields) and at least a maximum number of one register destination field (RD field), the superscalar processor comprising:

at least one execution unit for executing a plurality of in-flight instructions of the instruction set;

a plurality of registers;

a fetch unit for fetching the instructions from the instruction set;

an instruction renaming unit (IRU) for renaming architectural registers to physical registers during the processing of the instruction set;

an instruction scheduling unit (ISU) for scheduling the in-flight instructions for execution, the ISU including a dependency matrix for storing dependency data of the in-flight instructions and an instruction wait buffer (IWB) for storing physical address data necessary to execute the in-flight instructions when the dependency matrix indicates that the dependencies of the in-flight instructions have been removed; and a first predetermined number of content addressable memory (CAM) structures having a comparator section mapped to an array section, each CAM structure being dedicated to a single RS field and transmitting a first and second output signal, the first output signals of each CAM structure being logically OR-ed together at an ORing unit for generating the dependency data stored in the dependency matrix and the second output signals for each CAM structure being combined for generating the physical register address data stored in the IWB.

4. The superscalar processor of claim 3 wherein the RS fields have architectural addresses for instruction input data and the RD fields have architectural addresses for instruction output data, and wherein the CAM structures further comprise:

the comparator sections including a register dependency checker (RDC) for comparing an RS field of a fetched instruction to an RD field of an in-flight instruction;

the first output signals including a hit detect signal indicative of the architectural address of the RD field which is generated when a match, i.e. hit, between the RS field and the RD field is detected by the RDC, the hit detect signal additionally being transmitted to the array section of the CAM structures;

the array sections including an in-flight physical register mapper (IPM); and the second output signals including an output of the IPM indicative of the physical register address of the RD field which is generated when the IPM receives the hit detect signal.

5. The superscalar processor of claim 4 further comprising:
the plurality of physical registers including a queue area for storing a second predetermined maximum number of in-flight instructions of the instruction set;
the fetch unit fetching a bundle having a third predetermined fixed number of instructions from the instruction set; and
the RDC further including a plurality of the second predetermined number of entry structures, each entry structure including a plurality of the third predetermined number of comparators, each comparator dedicated to a single instruction in the bundle; wherein each RD field of the in-flight instructions is compared by a single entry structure to all instructions in the bundle substantially simultaneously to generate the hit detect signal.

6. A computer system comprising:
a bus;
an input/output subsystem for interfacing with input/output devices;
a memory subsystem having a memory for storing an instruction set having a plurality of instructions and a plurality of architectural registers associated therewith wherein the instruction set comprises one or more instructions whose data sources and destinations are registers; and
a superscalar processor for performing out of order processing on the instruction set and being in communication with the input/output system and the memory system through the bus, the superscalar processor including,
at least one execution unit for executing a plurality of in-flight instructions of the instruction set,
a plurality of physical registers,
a fetch unit for fetching the instructions from the instruction set,
an instruction renaming unit (IRU) for renaming architectural registers to physical registers during the processing of the instruction set,
an instruction scheduling unit (ISU) for scheduling the in-flight instructions for execution, the ISU including a dependency matrix for storing dependency data of all the in-flight instructions and an instruction wait buffer (IWB) for storing physical address data and operation codes necessary to execute the in-flight instructions when the dependency matrix indicates that the dependencies of the in-flight instructions have been removed, and
a content addressable memory (CAM) structure having a comparator section mapped to an array section, the CAM structure transmitting a first output signal for generating the dependency data stored in the dependency matrix and a second output signal for generating the physical register address data stored in the IWB.

7. The computer system of claim 6 wherein the CAM structure further comprises a plurality of CAM structures each having a first and second output signal, the first output signals being logically OR-ed together at an ORing unit to generate the dependency data.

8. A method for performing out of order processing on an instruction set having a plurality of instructions with a superscalar processor, the method comprising:
fetching the instructions from the instruction set wherein the instruction set comprises one or more instructions whose data sources and destinations are registers;
renaming architectural registers associated with the instructions to physical registers during the processing of the instruction set;
transmitting a first output signal from a content addressable memory (CAM) structure for generating dependency data of all in-flight instructions of the instruction set;
transmitting a second output signal from the CAM structure for generating physical register address data necessary to execute the in-flight instructions when the dependencies of the in-flight instructions have been removed;
storing the dependency data in a dependency matrix;
storing the physical register address data and operation codes in an instruction wait buffer;
scheduling the in-flight instructions for execution based on the dependency data and the physical register address data; and
executing the in-flight instructions.

9. The method of claim 8 wherein transmitting the first output signal further comprises:
transmitting a plurality of first output signals from a plurality of CAM structures; and
logically ORing the first output signals to generate the dependency data.

10. A superscalar processor for performing out of order processing on an instruction set having a plurality of instructions and a plurality of architectural registers associated therewith, the superscalar processor comprising:
at least one execution unit for executing a plurality of in-flight instructions of the instruction set;
a plurality of registers;
a fetch unit for fetching the instructions from the instruction set;
an instruction renaming unit (IRU) for renaming architectural registers to physical registers during the processing of the instruction set;
an instruction scheduling unit (ISU) for scheduling the in-flight instructions for execution, the ISU including a dependency matrix for storing dependency data of the in-flight instructions and an instruction wait buffer (IWB) for storing physical address data necessary to execute the in-flight instructions when the dependency matrix indicates that the dependencies of the in-flight instructions have been removed; and
a content addressable memory (CAM) structure having a comparator section mapped to an array section, the CAM structure transmitting a first output signal for generating the dependency data stored in the dependency matrix and a second output signal for generating the physical register address data stored in the IWB;
wherein the CAM structure further comprises a plurality of CAM structures each having a first and second output signal, the first output signals being logically OR-ed together at an ORing unit to generate the dependency data;
wherein the instructions have a first predetermined maximum number of register source fields (RS fields) and at least a maximum number of one register destination fields (RD fields); and
wherein the CAM structures further comprise the first predetermined maximum number of CAM structures, each CAM structure being dedicated to a single RS field.

11. A superscalar processor for performing out of order processing on an instruction set having a plurality of instructions and a plurality of architectural registers associated therewith, the superscalar processor comprising:

at least one execution unit for executing a plurality of in-flight instructions of the instruction set;

a plurality of registers;

a fetch unit for fetching the instructions from the instruction set;

an instruction renaming unit (IRU) for renaming architectural registers to physical registers during the processing of the instruction set;

an instruction scheduling unit (ISU) for scheduling the in-flight instructions for execution, the ISU including a dependency matrix for storing dependency data of the in-flight instructions and an instruction wait buffer (IWB) for storing physical address data necessary to execute the in-flight instructions when the dependency matrix indicates that the dependencies of the in-flight instructions have been removed; and a content addressable memory (CAM) structure having a comparator section mapped to an array section, the CAM structure transmitting a first output signal for generating the dependency data stored in the dependency matrix and a second output signal for generating the physical register address data stored in the IWB;

wherein the instructions have a first predetermined maximum number of register source fields (RS fields) having an architectural addresses for instruction input data and at least a maximum number of one register destination fields (RD fields) having architectural addresses for instruction output data; and wherein the CAM structure further comprises:

the comparator section including a register dependency checker (RDC) for comparing an RS field of a fetched instruction to an RD field of an in-flight instruction; and the first output signal including a hit detect signal indicative of the architectural address of the RD field which is generated when a match, i.e. hit, between the RS field and the RD field is detected by the RDC, the hit detect signal additionally being transmitted to the array section of the CAM structure.

12. The superscalar processor of claim 11 wherein the CAM structure further comprises:

the array section including an in-flight physical register mapper (IPM); and the second output signal including an output signal indicative of the physical register address of the RD field which is generated when the IPM receives the hit detect signal.

13. The superscalar processor of claim 11 wherein the CAM structure further comprises a plurality of the first predetermined number of CAM structures, each CAM structure being dedicated to a single RS field.

14. The superscalar processor of claim 13 wherein the hit detect signals of each CAM structure are OR-ed together in an ORing unit to generate the dependency data.

15. The superscalar processor of claim 14 further comprising:

the plurality of physical registers including a queue area for storing a second predetermined maximum number of in-flight instructions of the instruction set; and the fetch unit fetching a bundle having a third predetermined fixed number of instructions from the instruction set.

16. The superscalar processor of claim 15 further comprising an intra dependency checker having an output signal indicative of the dependencies between the instructions in the bundle, the output signal of the intra dependency checker being combined with the OR-ed output signals of the hit detect signals to generate the dependency data.

17. The superscalar processor of claim 16 wherein the RDC further comprises:

a plurality of the second predetermined number of entry structures, each entry structure including a plurality of the third predetermined number of comparators, each comparator dedicated to a single instruction in the bundle; wherein each RD field of the in-flight instructions is compared by a single entry structure to all instructions in the bundle substantially simultaneously.

18. The superscalar processor of claim 17 wherein the hit detect signal further comprises an array of the second predetermined number by the third predetermined number in size, which includes the output of hits detected for each of the entry structures compared to each of the instructions in the bundle.

19. A computer system comprising:

a bus;

an input/output subsystem for interfacing with input/output devices;

a memory subsystem having a memory for storing an instruction set having a plurality of instructions and a plurality of architectural registers associated therewith; and A superscalar processor for performing out of order processing on the instruction set and being in communication with the input/output system and the memory system through the bus, the superscalar processor including, at least one execution unit for executing a plurality of in-flight instructions of the instruction set, a plurality of physical registers, a fetch unit for fetching the instructions from the instruction set, an instruction renaming unit (IRU) for renaming architectural registers to physical registers during the processing of the instruction set, an instruction scheduling unit (ISU) for scheduling the in-flight instructions for execution, the ISU including a dependency matrix for storing dependency data of the in-flight instructions and an instruction wait buffer (IWB) for storing physical address data necessary to execute the in-flight instructions when the dependency matrix indicates that the dependencies of the in-flight instructions have been removed, and a content addressable memory (CAM) structure having a comparator section mapped to an array section, the CAM structure transmitting a first output signal for generating the dependency data stored in the dependency matrix and a second output signal for generating the physical register address data stored in the IWB;

wherein the CAM structure further comprises a plurality of CAM structures each having a first and second output signal, the first output signals being logically OR-ed together at an ORing unit to generate the dependency data;

wherein the instructions have a first predetermined maximum number of register source fields (RS fields) and at least a maximum number of one register destination fields (RD fields); and wherein the CAM structures further comprise the first predetermined maximum number of CAM structures, each CAM structure being dedicated to a single RS field.

20. A computer system comprising:
a bus;
an input/output subsystem for interfacing with input/output devices;
a memory subsystem having a memory for storing an instruction set having a plurality of instructions and a plurality of architectural registers associated therewith; and
a superscalar processor for performing out of order processing on the instruction set and being in communication with the input/output system and the memory system through the bus, the superscalar processor including,
   at least one execution unit for executing a plurality of in-flight instructions of the instruction set,
   a plurality of physical registers,
   a fetch unit for fetching the instructions from the instruction set,
   an instruction renaming unit (IRU) for renaming architectural registers to physical registers during the processing of the instruction set,
   an instruction scheduling unit (ISU) for scheduling the in-flight instructions for execution, the ISU including a dependency matrix for storing dependency data of the in-flight instructions and an instruction wait buffer (IWB) for storing physical address data necessary to execute the in-flight instructions when the dependency matrix indicates that the dependencies of the in-flight instructions have been removed, and
   a content addressable memory (CAM) structure having a comparator section mapped to an array section, the CAM structure transmitting a first output signal for generating the dependency data stored in the dependency matrix and a second output signal for generating the physical register address data stored in the IWB;
wherein the instructions have a first predetermined maximum number of register source fields (RS fields) having an architectural addresses for instruction input data and at least a maximum number of one register destination fields (RD fields) having architectural addresses for instruction output data; and
wherein the CAM structure further comprises:
   the comparator section including a register dependency checker (RDC) for comparing an RS field of a fetched instruction to an RD field of an in-flight instruction; and
   the first output signal including a hit detect signal indicative of the architectural address of the RD field which is generated when a match, i.e. hit, between the RS field and the RD field is detected by the RDC, the hit detect signal additionally being transmitted to the array section of the CAM structure.

21. The computer system of claim 20 wherein the CAM structure further comprises:
the array section including an in-flight physical register mapper (IPM); and
the second output signal including an output signal indicative of the physical register address of the RD field which is generated when the IPM receives the hit detect signal.

22. The computer system of claim 20 wherein the CAM structure further comprises a plurality of the first predetermined number of CAM structures, each CAM structure being dedicated to a single RS field.

23. The computer system of claim 22 wherein the hit detect signals of each CAM structure are OR-ed together in an ORing unit to generate the dependency data.

24. The computer system of claim 23 further comprising:
the plurality of physical registers including a queue area for storing a second predetermined maximum number of in-flight instructions of the instruction set; and
the fetch unit fetching a bundle having a third predetermined fixed number of instructions from the instruction set.

25. The computer system of claim 24 further comprising an intra dependency checker having an output signal indicative of the dependencies between the instructions in the bundle, the output signal of the intra dependency checker being combined with the OR-ed output signals of the hit detect signals to generate the dependency data.

26. The computer system of claim 25 wherein the RDC further comprises:
a plurality of the second predetermined number of entry structures, each entry structure including a plurality of the third predetermined number of comparators, each comparator dedicated to a single instruction in the bundle; wherein each RD field of the in-flight instructions is compared by a single entry structure to all instructions in the bundle substantially simultaneously.

27. The computer system of claim 26 wherein the hit detect signal further comprises an array of the second predetermined number by the third predetermined number in size, which includes the output of hits detected for each of the entry structures compared to each of the instructions in the bundle.

28. A method for performing out of order processing on an instruction set having a plurality of instructions with a superscalar processor, the method comprising:
fetching the instructions from the instruction;
renaming architectural registers associated with the instructions to physical registers during the processing of the instruction set;
transmitting a first output signal from a content addressable memory (CAM) structure for generating dependency data of in-flight instructions of the instruction set;
transmitting a second output signal from the CAM structure for generating physical register address data necessary to execute the in-flight instructions when the dependencies of the in-flight instructions have been removed;
storing the dependency data in a dependency matrix;
storing the physical register address data in an instruction wait buffer;
scheduling the in-flight instructions for execution based on the dependency data and the physical register address data; and
executing the in-flight instructions;
wherein the instructions have a first predetermined maximum number of register source fields (RS fields) having an architectural addresses for instruction input data and at least a maximum number of one register destination fields (RD fields) having architectural addresses for instruction output data; and wherein the transmitting the first output signal further comprises:
   comparing an RS field of a fetched instruction to an RD field of an in-flight instruction within a comparator section of a CAM structure; and generating a hit detect signal indicative of the architectural address of the RD field when the RS field and the RD field match, i.e. hit, and transmitting the hit detect signal additionally to an array section of the CAM structure.

29. The method of claim 28 wherein transmitting the second output signal further comprises generating the second output signal when the array section receives the hit detect signal, the second output signal being indicative of the physical register address of the RD field.

30. The method of claim 29 wherein the CAM structure further comprises a plurality of the first predetermined number of CAM structures, each CAM structure being dedicated to a single RS field.

31. The method of claim 30 further comprising logically ORing the hit detect signals of each CAM structure to generate the dependency data.

32. The method of claim 31 further comprising:

fetching a bundle of instructions from the instruction set;

generating an intra-dependency signal indicative of intra-dependencies of instructions within the bundle;

combining the intra-dependency signal with the OR-ed output signals of the hit detect signals to generate the dependency data.

* * * * *